No. 663,527. Patented Dec. 11, 1900.
A. WHITE.
WHEELED COASTER.
(Application filed Aug. 15, 1900.)
(No Model.)

Witnesses.
O. H. Keeney.
Anna V. Faust.

Inventor.
Arthur White.
By Benedict and Morsell
Attorneys.

THE NORRIS PETERS CO., PHOTO-LITHO., WASHINGTON, D. C.

UNITED STATES PATENT OFFICE.

ARTHUR WHITE, OF SHEBOYGAN FALLS, WISCONSIN.

WHEELED COASTER.

SPECIFICATION forming part of Letters Patent No. 663,527, dated December 11, 1900.

Application filed August 15, 1900. Serial No. 26,939. (No model.)

*To all whom it may concern:*

Be it known that I, ARTHUR WHITE, of Sheboygan Falls, in the county of Sheboygan and State of Wisconsin, have invented a new and useful Improvement in Wheeled Coasters, of which the following is a description, reference being had to the accompanying drawings, which are a part of this specification.

My invention has relation to improvements in wheeled coasters, and more especially to a class of coasters such as described in my pending application for patent, filed July 30, 1900, Serial No. 25,226.

The present invention has for its object more especially to provide an improved construction for changing or controlling the direction of the running of the wagon downhill or as a coaster by shifting the position of the front axle and the wheels thereon.

With the above primary object in view the invention consists of the devices and parts or their equivalents, as hereinafter set forth.

Figure 1:
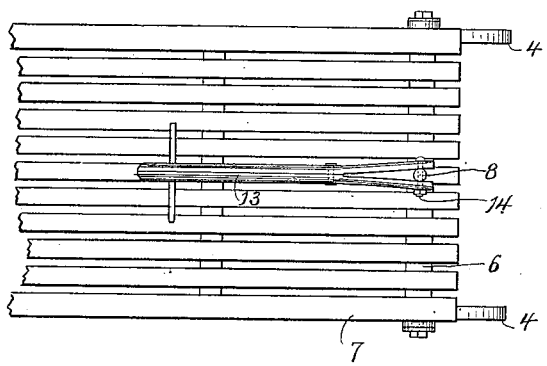
Figure 2:
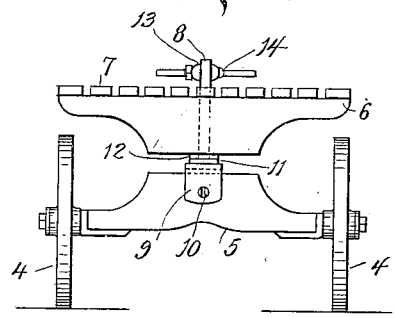

In the accompanying drawings, Figure 1 is a plan view of so much of the vehicle as is necessary to illustrate my invention. Fig. 2 is a front elevation of the vehicle; and Fig. 3 is a side elevation of Fig. 1, parts being broken away and showing the tongue in full lines as turned rearwardly and in dotted lines as turned forwardly.

Referring to the drawings, the numerals 4 4 indicate the front wheels, mounted on an axle 5, and 6 the front bolster, said bolster being secured to the under side of the bottom 7 of the vehicle. Passing loosely through a central opening in the bolster is a king-bolt 8, said bolt serving to connect the axle to the bolster and forming the pivot about which the swiveling of the axle occurs. The king-bolt is preferably formed or provided with a furcate or U-shaped lower end 9, the furcate parts thereof straddling or embracing the axle. This furcate extremity is connected pivotally to the axle by means of a pivot-bolt 10. The top of the furcate extremity is provided with a boss 11, preferably circular in shape and forming a bearing between the axle and the bolster, by means of which the bolster and its load are supported on the axle and permit the axle to swivel thereunder. By preference a metallic bearing-plate 12 is interposed between this boss and the under side of the bolster.

The upper end of the king-bolt extends a convenient distance above the bottom of the vehicle and is adapted to have pivotally secured thereto the end of the tongue 13. The pivot connection is preferably formed by splitting the end of the tongue and causing said split end to straddle the king-bolt and a pivot-pin 14, passed through openings in said split end and through a registering opening in the king-bolt.

Figure 3:
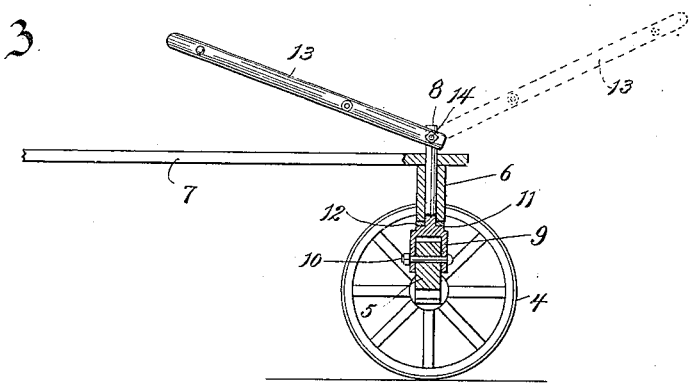

In the use and application of my invention when the tongue is thrown forwardly to the dotted-line position shown in Fig. 3 it is then used to haul the wagon about. When, however, the tongue is thrown rearwardly to the full-line position shown in Fig. 3, it serves as a lever or tiller, which can be grasped by a boy sitting in the wagon and swung to the right or left to thereby shift the position of the wheels and change the direction of the running of the wagon. In my pending application for patent hereinbefore referred to the tongue is shown as pivoted to forwardly-projecting hounds, and when said tongue is thrown rearwardly it is fulcrumed on a thole-pin. By my present construction, wherein the tongue is pivoted directly to the king-bolt, an effective and simple steering means is provided without the necessity of employing the forwardly-extending hounds and the separate fulcrum provided by the thole-pin, as in said former application for patent.

While the specific construction of the lower end of the king-bolt—*i. e.*, the furcate or U-shaped lower extremity, with the pivot-bolt 10 passing through the furcate parts and through the axle—is preferred, yet this particular arrangement is not absolutely essential, as the lower end of the king-bolt may be constructed in any desirable manner and either connected pivotally to the axle by the pivot-bolt 10 or connected rigidly to said axle, as preferred.

What I claim as my invention is—

1. The combination of a vehicle-bottom, a bolster secured therebeneath, an axle and the wheels mounted thereon, a king-bolt extending upwardly from the axle and loosely through the bolster and through the vehicle-bottom, and a tongue pivotally secured to the upper end of the king-bolt so as to be capable of being thrown forwardly and rearwardly.

2. The combination of a vehicle-bottom, an axle and the wheels mounted thereon, a king-bolt pivotally secured at its lower end on a pivot-bolt extending transversely of the axle, said king-bolt extending upwardly from the axle and loosely through the vehicle-bottom, and a tongue pivotally secured to the upper end of the king-bolt so as to be capable of being thrown forwardly and rearwardly.

In testimony whereof I affix my signature in presence of two witnesses.

ARTHUR WHITE.

Witnesses:
A. L. MORSELL,
ANNA V. FAUST.